United States Patent Office 3,328,389
Patented June 27, 1967

3,328,389
PROCESS FOR PREPARING NUCLEOTIDE DERIVATIVES
Bunzi Shimizu and Kouichi Iwase, Tokyo, Japan, assignors to Sankyo Company Limited, Chyuo-ku, Tokyo, Japan
No Drawing. Filed Aug. 2, 1965, Ser. No. 477,015
Claims priority, application Japan, Aug. 7, 1964, 39/44,333
1 Claim. (Cl. 260—211.5)

This invention relates to a novel process for preparing purine and pyrimidine nucleotide derivatives.

More particularly, it relates to a novel process for the preparation of purine and pyrimidine nucleotide derivatives having purine or pyrimidine ring as the base moiety and phosphorylated-pentose or -hexose containing the protected hydroxy group and the protected phosphoric acid group as the saccharide moiety.

The purine and pyrimidine nucleotide derivatives obtained by the process according to this invention may be represented by the following formulae:

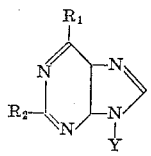

(I)

and

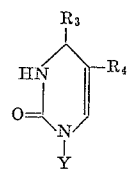

(II)

wherein each of $R_1$ and $R_2$ represents hydrogen atom, hydroxy group, mercapto group or acylamino group; each of $R_3$ and $R_4$ represents hydrogen atom, hydroxy group, amino group, mercapto group, an alkoxy group containing 1~5 carbon atoms or methyl group; and Y represents a phosphorylated glycosyl radical containing the protected hydroxy and phosphoric acid groups.

The term "glycosyl" as used herein means glycosyl derived from aldopentose and aldohexose such as D-, L- and DL-ribosyl, D-, L- and DL-xylosyl, D-, L- and DL-arabinosyl, D-, L- and DL-glucosyl, D-, L- and DL-mannosyl and D-, L- and DL-galactosyl.

There have been hitherto presented a number of papers on the process for preparing these purine and pyrimidine nucleotides, almost of which involve phosphorylation of a nucleoside. Only a process has been reported by Chunoshin Ukita, Hikoya Hayatsu et al. in Japanese Patent Publication 4490/1964 and in the Journal of the American Chemical Society, 84, 1879 (1962), in which such nucleotides have been prepared by reaction of phosphorylated halogeno-sugar with purine or pyrimidine. In this prior process, a nucleotide has been obtained by reaction of a phosphorylated halogeno-sugar derivative with an alkali metal salt of N-containing organic base.

However, the above-mentioned prior process has such disadvantage that it is difficult to produce various nucleotides in high yield.

As a result of various investigations, it has now been unexpectedly found that a purine or pyrimidine nucleotide derivative having the protected hydroxy and phosphoric acid groups can be prepared by reacting a compound containing purine or pyrimidine ring with tri-(lower alkyl)- chlorosilane or hexa-(lower alkyl)-disilazane in the presence of a teritary amine and fusing the resulting reaction product with a phosphorylated halogeno-pentose or -hexose at a temperature of about 80~120° C. According to this invention, there is attained such advantages that various types of nucleotides can be conveniently prepared in high yield.

It is therefore an object of this invention to provide a novel and commercially available process for preparing purine and pyrimidine nucleotides having the above Formulae I and II.

Other objects and advantages of this invention will become apparent from the following detailed description.

According to the process of this invention, the purine or pyrimidine nucleotide derivatives having the above Formulae I or II can be prepared by reacting purine derivative having the formula

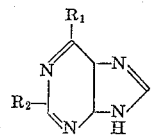

(III)

wherein $R_1$ and $R_2$ have the same meanings as set forth above or pyrimidine derivative having the formula

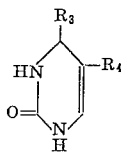

(IV)

wherein $R_3$ and $R_4$ have the same meanings as set forth above with a tri-(lower alkyl)-chlorosilane or a hexa-(lower alkyl)-disilazane in the presence of a tertiary amine under anhydrous conditions and heating the resulting reaction product with a phosphorylated halogeno-pentose or -hexose containing the protected hydroxy and phosphoric acid groups at a temperature ranging from about 80° C. to 120° C.

In carrying out the process of this invention where the compounds having the above Formula III or IV contain amino group, the first step preferably involves protection of the amino group with an acyl group before the step is carried out.

The first step in the process according to this invention is carried out by reacting a compound having the above Formula III or IV with a tri-(lower alkyl)-chlorosilane in an anhydrous organic solvent in the presence of a tertiary amine or reacting a compound having the above Formula III or IV with a hexa-(lower alkyl)-disilazane under anhydrous conditions. In carrying out the first step in the process, the reaction should be conducted under anhydrous conditions regardless of variation of the reactant employed.

When the tri-(lower alkyl)-chlorosilane is employed as the reactant, examples of suitable organic solvents are anhydrous inert organic solvents such as benzene, toluene, xylenes or dioxane and examples of tertiary amines are tri-lower alkyl-amine such as trimethylamine, triethylamine or tripropylamine and cyclic tertiary amine such as pyridine. The reaction may be normally conducted at room temperature, but the more elevated temperature may be satisfactorily employed.

When the hexa-(lower alkyl)-disilazane is employed as the reactant, the reaction may be preferably conducted by suspending a compound having the above Formula III or IV in a hexa-(lower alkyl)-disilazane and heating the resultant suspension under reflux.

After completion of the reaction in the first step, the reaction product may be recovered from the reaction mixture by any of conventional methods. For instance, where a tri-(lower alkyl)-chlorosilane is employed, after completion of the reaction, the reaction mixture is filtered, the solvent is distilled off from the filtrate and then the residue is further distilled to obtain the reaction product, and, for example, where a hexa-(lower alkyl)-disilazane is employed, after completion of the reaction, the reaction mixture is distilled in situ to obtain the reaction product.

The reaction product thus obtained may be employed, as it is or after the further purification, in the next second step.

In carrying out the second step in the process, the reaction product obtained from the above first step is heated at a temperature ranging from about 80° C. to 120° C. with a phosphorylated halogeno-pentose or a phosphorylated halogeno-hexose, these halogeno-sugars having the protected hydroxy and phosphoric acid groups. The above-specified temperature range is critical in this second step of the process, since, if below the said lower limit, the reaction in this step does not proceed and also, if above the said upper limit, the reaction product undergoes a thermal decomposition to yield the undesirable by-product. The reaction in the second step may also be carried out in an inert atmosphere such as nitrogen gas.

Examples of suitable phosphorylated halogeno-pentose- or-hexose are 2,3,4-O-acetyl (or benzoyl)-6-diphenyl (or p-nitrophenyl or benzyl) phosphoryl-D-glucopyranosyl-halogenide; or 2,3-di-O-acetyl (or benzoyl)-5-di-phenyl (or p-nitrophenyl or benzyl) phosphoryl-D-ribofuranosylhalogenide.

After completion of the reaction, the reaction product may be recovered from the reaction mixture by any of conventional methods. For instance, after completion of the reaction, the reaction mixture is cooled and aqueous ethanol is added thereto, thereby being removed the unreacted silyl groups. The resulting solution is then evaporated and the residue dissolved in a suitable organic solvent such as chloroform. The solution is washed with water and then chromatographed with silica-gel column to obtain the pure desired product.

The purine or pyrimidine derivatives having the above Formula I or II obtained as described above may be converted to the corresponding nucleotides with a conventional mean, by which the group protecting the hydroxy and phosphoric acid groups would be removed. For instance, in case of the purine derivatives having the above Formula I, the reaction product is treated with an alkali metal hydroxide and an alkali metal methoxide followed by with phosphodiesterase to remove the present protecting group. And also, in case of the pyrimidine derivatives having the above Formula II, the present protecting group may be removed from the reaction product by a conventional hydrogenolytic mean.

This invention is more fully illustrated by the following examples.

EXAMPLE 1

*Preparation of 3-(5'-diphenylphosphosphoryl-2',3'-di-O-benzoyl-D-ribofuranosyl)thymine*

To a suspensinon of 12.6 g. of thymine in 120 ml. of anhydrous benzene is added 21.7 g. of trimethylchlorosilane and a solution of 20 g. of triethylamine in 50 ml. of benzene is added dropwise to the mixture with stirring. The stirring of the mixture is continued for several hours at room temperature.

After completion of the reaction, the reaction mixture is filtered to remove a crystalline substance, which is then washed several times with benzene.

The combined filtrate and washings are concentrated and the residue is distilled under reduced pressure to yield 22.2 g. of bistrimethylsilylthymine, boiling at 124.5° C./14 mm. Hg.

A solution of 1.4 g. of the bistrimethylsilylthymine thus obtained and the ribofuranosyl bromide (prepared by the bromination of 3 g. of methyl-5-diphenylphosphoryl-2,3-di-O-benzoyl-D-ribofuranoside with hydrobromic acid in the presence of acetic acid) in dried toluene is prepared and thereafter the toluene is distilled off under reduced pressure. The residue is fused with heating at a temperature of from 100° C. to 110° C. for about 40 minutes.

After cooling, the reaction mixture is dissolved in ethanol to remove the unreacted silyl group in the reaction product and the ethanol is distilled off under reduced pressure. The residue is dissolved in xylene warmed at 100° C. From the warmed xylene solution is filtered off a small amount of insoluble material and to the filtrate is added petroleum ether in a volume four times as much as that of the said xylene solution to separate the precipitate, which is recovered by filtration and dissolved in chloroform. The chloroform is distilled off from the chloroform solution and then a solution of the residue in ethanol is allowed to stand, thereby yielding crude crystalline substance, melting at 138~140° C. The substance is recrystallized from ethanol to give 1.1 g. of the pure desired product, melting at 142° C. Yield: 48.1%.

*Analysis.*—Calculated for $C_{36}H_{31}O_{11}N_2P$; N, 4.01; P, 4.43. Found: N, 4.36; P, 4.80.

Mixed melting point of the product thus obtained and an authentic sample is not depressed and the infrared spectrum thereof is also identical with that of an authentic sample.

EXAMPLE 2

*Preparation of 3-(5'-diphenylphosphoryl-2',3'-di-O-benzoyl-D-ribofuranosyl)uracil*

To a suspension of 11.2 g. of uracil in 150 ml. of dioxane is added 21 g. of trimethylchlorosilane and to the mixture is added dropwise with stirring 19.5 g. of triethylamine. The stirring of the reaction mixture is continued for several hours at room temperature.

After completion of the reaction, the reaction mixture is filtered to remove a crystalline substance, which is then washed with dioxane, and the combined filtrate and washings are concentrated. The residue is distilled to give 15.7 g. of bistrimethylsilyluracil, boiling at 116° C./12 mm. Hg.

The ribofuranosyl bromide (prepared by bromination of 3 g. of methyl-5-diphenylphosphoryl-2,3-di-O-benzoyl-D-ribofuranoside with hydrobromic acid in the presence of acetic acid) is fused with 1.3 g. of the bistrimethylsilyluracil thus obtained at a temperature of from 100 to 110° C. and thereafter treated in the same manner as in Example 1 to give 1.0 g. of the pure desired product, which is recrystallized from ethanol to yield needles, melting at 185~188° C. Yield: 49.1%.

*Analysis.*—Calculated for $C_{35}H_{29}O_{11}N_2P$; C, 61.40; H, 4.24; N, 4.09; P, 4.53. Found: C, 60.59; H, 4.10; N, 4.26; P, 4.59.

EXAMPLE 3

*Preparation of 9-(5'-diphenylphosphoryl-2',3'-di-O-benzoyl-D-ribofuranosyl)-6-benzoylaminopurine*

To a suspension of 24 g. of N-benzoyladenine in 200 ml. of anhydrous benzene is added 21.7 g. of trimethylchlorosilane and to the mixture is added dropwise with stirring 20.2 g. of triethylamine. The mixture thus obtained is subsequently treated in the same manner as in Example 2 to give 25.3 g. of bistrimethylsilyl-N-benzoyladenine, melting at 177~184° C./8×10⁻⁴ mm. Hg.

In the same manner as in Example 2, 3.0 g. of methyl-5 - diphenyl - phosphoryl-2,3-di-O-benzoyl-D-ribofurano-side is brominated in dichloromethane with hydrobromic acid in the presence of acetic acid and to the resulting mixture is added toluene. The toluene is distilled off under reduced pressure at a bath temperature below 45° C. until an acid odor disappears, thereby yielding ribofuranosul bromide.

The ribofuranosyl bromide thus obtained is fused under reduced pressure at about 100° C. for 40 minutes with 2 g. of bistrimethylsilyl-N-benzoyl-adenine obtained as described hereinabove.

The reaction mixture is subsequently treated in the same manner as in Example 1 to give 1.0 g. of the desired product as amorphous substances. Yield: 37.6%.

Analysis.—Calculated for $C_{43}H_{34}O_{10}N_5P$; C, 63.62; H, 4.19; N, 8.63; P, 3.82. Found: C, 63.59; H, 4.43; N, 8.57; P, 3.56.

UV: $\lambda_{max.}^{ETOH}$ 230, 261 (shoulder), 280

$\lambda_{min.}^{ETOH}$ 255 (in m$\mu$)

After purifying with silica-gel chromatography, the infrared spectrum of the desired product is identical with that of an authentic sample.

EXAMPLE 4

*Preparation of 9-(5'-diphenylphosphoryl-2',3'-di-O-benzoyl-D-ribofuranosyl)hypoxanthine*

A suspension of 9.45 g. of hypoxanthine in 23 g. of hexamethyldisilazane is heated with occasional shaking under reflux on an oil bath for about 12 hours. After completion of the reaction, the reaction mixture is distilled to give 15.5 g. of bistrimethylsilylhyposanthine, boiling at 150~153° C./2 mm. Hg.

On the other hand, 3.0 g. of methyl-5-diphenylphosphoryl-2,3-di-O-benzoyl-D-ribofuranoside is brominated in the same manner as in Example 2 to produce the corresponding ribofuranosyl bromide.

The ribofuranosyl bromide thus obtained is heated at 100° C. under reduced pressure for 50 minutes with 1.3 g. of bistrimethylsilylhypoxanthine obtained as described hereinabove.

The resultant reaction mixture is subsequently treated in the same manner as in Example 3 to give 1.3 g. of the desired product as a white amorphous substance. Yield; 59.2%. Mixed melting point of the said product and an authentic sample is not depressed.

Analysis.—Calculated for $C_{36}H_{29}O_{10}N_4P$; N, 7.92; P, 4.38. Found: N, 8.39; P, 4.28.

EXAMPLE 5

*Preparation of 7-(5'-diphenylphosphoryl-2',3'-di-O-benzoyl-D-ribofuranosyl)theophylline*

To a suspension of 9 g. of dried theophylline and 6 g. of trimethylchlorosilane in 100 ml. of anhydrous benzene is added a solution of 5.6 g. of trimethylamine in 15 ml. of benzene and the mixture is allowed to stand with stirring at room temperature overnight. After completion of the reaction, the separating triethylamine hydrochloride is filtered off, and then from the filtrate is distilled off under reduced pressure the solvent to give 11.0 g. of 7-trimethylsilyltheophylline.

On the other hand, 3 g. of methyl-5-diphenylphosphoryl-2,3-di-O-benzoyl-D-ribofuranoside is brominated in the same manner as in Example 2 to produce the corresponding ribofuranosyl bromide.

The ribofuranosyl bromide thus obtained and 1.3 g. of 7-trimethylsilyltheophylline obtained as described hereinabove are fused under reduced pressure at 90~100° C. for 30 minutes. After completion of the reaction, the reaction mixture is treated in the same manner as in Example 3 to give 1.10 g. of the desired product, melting at 154~156° C. Yield; 73.3%.

Analysis.—Calculated for $C_{38}H_{33}O_{11}N_4P$; C, 60.63; H, 4.39; N, 7.44; P, 4.12. Found: C, 60.92; H, 4.39; N, 8.02; P, 3.72.

EXAMPLE 6

*Preparation of 3-(5'-diphenylphosphoryl-2',3'-di-O-benzoyl-D-ribofuranosyl)-6-ethoxy-2[H]-pyrimidinone*

To a suspension of 2.8 g. of anhydrous 1,2-dihydro-2-keto-4-ethoxypyrimidine and 2.4 g. of trimethylchlorosilane in 20 ml. of benzene is added a solution of 2.2 g. of triethylamine in 6 ml. of benzene, and the mixture is allowed to stand with stirring at room temperature overnight. After completion of the reaction, the separating triethylamine hydrochloride is filtered off and the filtrate is concentrated under reduced pressure. The residue is distilled under reduced pressure to give 2.8 g. of trimethylsilyl-1,2-dihydro-2-keto-4-ethoxy-pyrimidine.

On the other hand, 3 g. of methyl-5-diphenylphosphoryl-2,3-di-O-benzoyl-D-ribofuranoside is brominated in the same manner as in Example 2 to produce the corresponding ribofuranosyl bromide.

The ribofuranosyl bromide thus obtained and 1.1 g. of trimethylsilyl-1,2-dihydro-2-keto-4-ethoxypyrimidine is fused under reduced pressure at 80~90° C. for 35 minutes. After completion of the reaction, the reaction mixture is dissolved in ethanol and the solvent is distilled off. The residue is dissolved in about 60 ml. of xylene while hot, insoluble substance is filtered off and then 300 ml. of petroleum ether is added to the filtrate, thereby separating the syrupy substance, which is then isolated from the solution and dissolved in chloroform. The chloroform is distilled off under reduced pressure to leave 2.9 g. of the crude desired product as yellow amorphous powders, which is subsequently purified with silica-gel chromatography; that is, after initially removing the unreacted furanose with benzene, elution with a mixture of chloroform-benzene (1:9) gives 0.7 g. of the pure desired product. Yield; 35.0%.

Analysis.—Calculated for $C_{37}H_{35}O_{11}N_2P$; C, 62.35; H, 4.63; N, 3.95; P, 4.35. Found: C, 62.13; H, 4.77; N, 4.10; P, 4.08.

EXAMPLE 7

*Preparation of 3-(6'-dinitrophenylphosphoryl-2',3',4'-tri-O-acetyl-D-glucopyranosyl)uracil*

In the same manner as in Example 2, 0.4 g. of bistrimethylsilyluracil is prepared from 0.28 g. of uracil and 0.57 g. of trimethylchlorosilane.

On the other hand, 1.0 g. of methyl-6-dinitrophenylphosphoryl-2,3,4-tri-O-acetyl-D-glucopyranose is brominated in the same manner as in Example 2 to produce the corresponding glucopyranosyl bromide.

The bistrimethylsilyluracil thus obtained and the glucopyranosyl bromide are fused at 120° C. for about 50 minutes. After completion of the reaction, the reaction mixture is treated in the same manner as in Example 3 to give 0.29 g. of the desired product as colorless amorphous substance. Yield; 25%.

Analysis.—Calculated for $C_{28}H_{27}O_{17}N_4P$; N, 7.73; P, 4.28. Found: N, 8.38; P, 4.64.

UV: $\lambda_{max.}^{ETOH}$ 261, $\lambda_{min.}^{ETOH}$ 231 (in m$\mu$)

What is claimed is:

A process for preparing a compound selected from the group consisting of compounds having the formulae

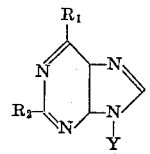

and

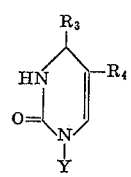

wherein each of $R_1$ and $R_2$ represents hydroxy, mercapto or acylamino; each of $R_3$ and $R_4$ represents hydrogen, hydroxy, amino, mercapto, alkoxy of 1–5 carbon atoms or methyl; and Y represents 5'- or 6'-monophosphorylated glycosyl containing the protected hydroxy and phosphoric acid groups, which comprises reacting a compound selected from the group consisting of compounds having the formulae

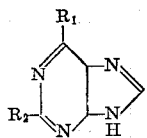

and

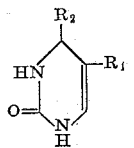

wherein $R_1$, $R_2$, $R_3$ and $R_4$ have the above meanings, with a compound selected from the group consisting of tri-(lower alkyl)-chlorosilanes and hexa-(lower alkyl)-disilazanes under anhydrous conditions and heating the resulting product with a compound selected from the group consisting of 5′-monophosphorylated halogenopentoses and 6′-monophosphorylated halogenohexoses at a temperature ranging from about 80° C. to 120° C.

References Cited

UNITED STATES PATENTS 3,208,997   9/1965   Iwai et al. _____ 260—211.5

LEWIS GOTTS, *Primary Examiner.*

JOHNNIE R. BROWN, *Assistant Examiner.*